United States Patent
Levitt et al.

(10) Patent No.: US 10,522,315 B2
(45) Date of Patent: Dec. 31, 2019

(54) COMPACT MULTI ANTENNA BASED ION SOURCES

(71) Applicant: SCHLUMBERGER TECHNOLOGY CORPORATION, Sugar Land, TX (US)

(72) Inventors: Benjamin Levitt, Boston, MA (US); Brian Munroe, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 52 days.

(21) Appl. No.: 15/698,685

(22) Filed: Sep. 8, 2017

(65) Prior Publication Data

US 2019/0080873 A1 Mar. 14, 2019

(51) Int. Cl.
| | |
|---|---|
| H01J 7/24 | (2006.01) |
| H05B 31/26 | (2006.01) |
| H01J 27/18 | (2006.01) |
| H01Q 21/00 | (2006.01) |
| H02J 50/23 | (2016.01) |

(Continued)

(52) U.S. Cl.
CPC .............. H01J 27/18 (2013.01); H01Q 1/04 (2013.01); H01Q 21/0006 (2013.01); H02J 50/23 (2016.02); H05H 3/06 (2013.01)

(58) Field of Classification Search
None
See application file for complete search history.

(56) References Cited

U.S. PATENT DOCUMENTS

| 5,293,410 A | 3/1994 | Chen et al. | |
|---|---|---|---|
| 6,094,012 A | * 7/2000 | Leung | H01J 27/18 250/423 R |

(Continued)

FOREIGN PATENT DOCUMENTS

| JP | 2007328965 A | 12/2007 |
|---|---|---|
| WO | 2011060282 A2 | 5/2011 |

OTHER PUBLICATIONS

Ishikawa, J. et al., "Axial magnetic field extraction-type microwave ion source with a permanent magnet", Review of Scientific Instruments, 1984, 55(4), pp. 449-456.

(Continued)

Primary Examiner — Anh Q Tran

(57) ABSTRACT

An ion generating device including a time-varying electromagnetic power source; and a multi-antenna ion source including a plurality of live antennas electrically coupled to the power source; and a grounded antenna. A neutron generator, including a time-varying electromagnetic power source; a hermetically-sealed tube; a multi-antenna ion source within tube, the multi-antenna ion source including a plurality of live antennas electrically coupled to the time-varying electromagnetic power source; and at most one grounded antenna; an extractor adjacent to an aperture of the multi-antenna ion source; at least one magnet generating a magnetic field substantially parallel to a longitudinal axis of the multi-antenna ion source; a target within the hermetically-sealed tube; and a plurality of electrodes for accelerating and/or decelerating ions toward the target, where the power source operates at a frequency corresponding to a cyclotron frequency defined by a value of the magnetic field within the multi-antenna ion source.

21 Claims, 8 Drawing Sheets

(51) Int. Cl.
*H05H 3/06* (2006.01)
*H01Q 1/04* (2006.01)

(56) References Cited

U.S. PATENT DOCUMENTS

| | | | |
|---|---|---|---|
| 2006/0057854 A1* | 3/2006 | Setsuhara | H01J 37/32174 438/710 |
| 2011/0140641 A1 | 6/2011 | Won et al. | |
| 2011/0260621 A1* | 10/2011 | Sortais | H01J 27/16 315/111.41 |
| 2014/0263993 A1 | 9/2014 | Perkins et al. | |
| 2014/0265858 A1* | 9/2014 | Perkins | H01J 27/024 315/111.91 |
| 2015/0228438 A1* | 8/2015 | Rosenthal | H01J 27/18 376/112 |

OTHER PUBLICATIONS

Song, Z. et al., "A compact microwave ion source with permanent magnet", Review of Scientific Instruments, 1992, 53(4), pp. 2553-2555.
Sortais, P. et al., "Ultracompact/ultralow power electron cyclotron resonance ion source for multipurpose applications", Review of Scientific Instruments, 2010, 81, 02B314: 4 pages.
Waldmann, O. et al., "Measurements of beam current density and proton fraction of a permanent-magnet microwave on source", Rev. Sci. Inst., 2011, 82, 113505:4 pages.
Kim, I.J. et al, "A D-D Neutron Generator Using a Titanium Drive-In Target", Nuclear Instruments and Methods in Physics Research B: Beam Interactions with Materials and Atoms, vol. 266, Issue 5, (Mar. 2008), pp. 829-833.
International Search Report and Written Opinion for corresponding PCT Application Serial No. PCT/US2018/050135, dated Jan. 4, 2019, 11 pages.

* cited by examiner

COMPACT MULTI ANTENNA BASED ION SOURCES

BACKGROUND

The use of a generator of high energy neutrons has been employed for a long time for neutron-gamma ray or neutron-neutron well logging. A neutron generator has advantages compared with chemical neutron sources, in particular it features a negligible amount of radiation other than the desired neutrons; a controllable yield of neutrons in bursts or continuously; neutrons at higher energies than are easily accessible with a chemical source; mono-energetic neutrons; and control of the generator so as to permit its deactivation prior to withdrawal from or insertion in a well. The ability to deactivate the neutron generator by turning it off is an advantageous safety feature, compared to a chemical source which is always on. The first five of these attributes are important in obtaining more informative logs, while the last is valuable in minimizing health hazards to operating personnel.

Neutron generators used in oil well logging tools usually require controlled low pressure atmospheres. Neutron generators usually have three major features: (i) a gas source to supply the reacting substances, such as deuterium (H2) and tritium (H3); (ii) an ion source comprising usually at least one cathode and an anode; electrons are emitted from the cathode surface when an electrical impulse is applied to the anode; impact of the primary electrons on the gas molecules result in subsequent secondary electrons being stripped from the gas molecules, thus generating positively charged ions; and (iii) an accelerating gap which impels the ions to a target with such energy that the bombarding ions collide with deuterium or tritium target nuclei in neutron-generating nuclear fusion reactions.

Ordinarily, negative electrons and positively charged ions are produced through electron and neutral gas molecule ionizing collisions within the ion source. Electrodes of different electrostatic potential contribute to ion production by accelerating electrons to energy higher than the ionization threshold. Collisions of those energetic electrons with gas molecules ionize the latter, thereby producing ions and additional electrons.

Referring to FIG. 1, a hot cathode neutron generator (100) is shown, such as that described in U.S. Pat. No. 5,293,410, the contents of which are herein incorporated by reference in its entirety. The hot cathode generator (100) achieves neutron production via a fusion reaction produced when deuterium and/or tritium ions are electrostatically accelerated into a target (125) also comprising deuterium (D) and/or tritium (T). The hot cathode neutron generator (100) comprises a hermetically-sealed tube (128) enclosing a filament (105), a cathode (110), a gas (112), an extractor (120), and a target (125). In one or more embodiments, the filament (105) comprises zirconium, which serves as a deuterium or tritium reservoir. Passing an electric current through the filament provides a gas of deuterium or tritium within the hermetically-sealed tube (128). In one or more embodiments, the gas is diatomic, for example, $D_2$. Passing a current through the cathode (110) liberates electrons (112) which are accelerated by the grid (115) and gain kinetic energy. Pulsed operation may be achieved by applying a burst of positive voltage to the grid (115) to energize the electrons (112) from the cathode (110) to ionization energies. The energized electrons (112) ionize the neutral gas locally. The ions are then accelerated toward the target (125) by the potential difference between the extractor (120) and the target (125). The ions accelerating toward the target may be referred to as a beam (122) or ion beam. In the hot cathode neutron generator (100), the monatomic fraction of the ion beam (122) created by electronic collisions with neutral atoms may be small, perhaps 5% or less, with the remainder being diatomic. The monatomic fraction of an ion beam is the ratio of ions composed of a single atom to the total number of ions, both single-atom and multi-atom (diatomic and/or triatomic, typically). If, for example, the neutral gas were $H_2$, the monatomic fraction of the ion beam would equal the ratio of the number of $H^+$ ions to the sum of $H^+$ and $H_2^+$ and $H_3^+$ ions. The same would apply to a neutral gas of $D_2$ or $T_2$. Because the mass of the diatomic ion is double that of the monatomic ion, it is accelerated to only half the energy per deuteron. Further, with an accelerating potential of about 100 kV, the monatomic ion beam yields proportionally about three times more neutrons than the diatomic ion beam, since the nuclear fusion cross section is energy dependent.

SUMMARY

This summary is provided to introduce a selection of concepts that are described further in the detailed description below. This summary is not intended to identify key or essential features of the claimed subject matter, nor is it intended to be used as an aid in limiting the scope of the claimed subject matter.

In one or more embodiments of the present disclosure, an ion generating device may comprise a time-varying electromagnetic power source and a multi-antenna ion source. The multi-antenna ion source may comprise a plurality of live antennas electrically coupled to the time-varying electromagnetic power source; and a grounded antenna.

In one or more embodiments of the present disclosure, an ion generating device may comprise a time-varying electromagnetic power source and a multi-antenna ion source. The multi-antenna ion source may comprise a plurality of live antennas electrically coupled to the time-varying electromagnetic power source, wherein the multi-antenna ion source may have no grounded antenna and the plurality of live antennas may not all have the same phase.

In one or more embodiments of the present disclosure, a neutron generator may comprise a time-varying electromagnetic power source; a hermetically-sealed tube; a multi-antenna ion source may be disposed within the hermetically-sealed tube, the multi-antenna ion source may comprise a plurality of live antennas electrically coupled to the time-varying electromagnetic power source; and at most one grounded antenna; an extractor may be disposed adjacent to an aperture of the multi-antenna ion source; at least one magnet may generate a magnetic field substantially parallel to a longitudinal axis of the multi-antenna ion source; a target may be disposed within the hermetically-sealed tube; and a plurality of electrodes may be configured to accelerate, decelerate, or both accelerate and decelerate ions toward the target, wherein the time-varying electromagnetic power source may operate at a frequency corresponding to a cyclotron frequency defined by a value of the magnetic field within the multi-antenna ion source.

In one or more embodiments of the present disclosure, a method for generating ions may comprise: providing a neutral gas; supplying electromagnetic energy from a time-varying electromagnetic power source to a multi-antenna ion source via a plurality of live antennas; and ionizing the electrically neutral gas to produce ions.

Other aspects and advantages will be apparent from the following description and the appended claims.

BRIEF DESCRIPTION OF DRAWINGS

Certain embodiments of the disclosure will hereafter be described with reference to the accompanying drawings, where like reference numerals denote like elements. It should be understood, however, that the accompanying figures illustrate the various implementations described herein and are not meant to limit the scope of various technologies described herein.

DETAILED DESCRIPTION

Figure 1:
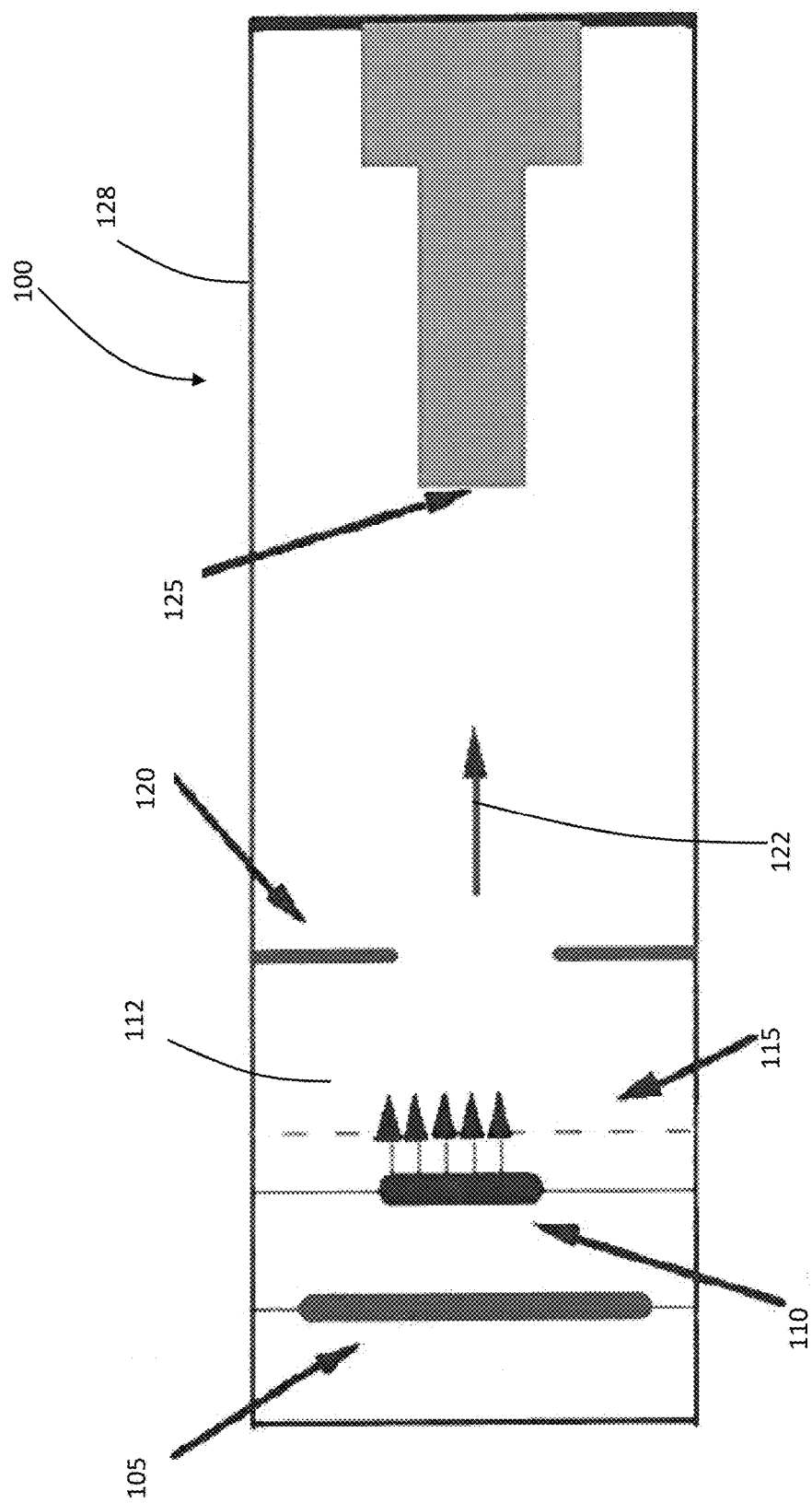
FIG. 1 is a schematic diagram of one or more embodiments of a hot cathode neutron generator.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicate like elements.

Embodiments of the present disclosure relate to multi-antenna ion sources such as, but not limited to, those used in neutron generators for downhole applications. However, it is also understood that the ion sources may have other applications, such as mass spectrometry, for particle accelerators, surface cleaning or thin film deposition, for example. Thus, no limitation on the end-use application of the ion source exists. In one or more embodiments, the ion source may use a plurality of live antennas coupled to a time-varying electromagnetic power source and no more than one grounded antenna to create ions. In one or more embodiments, the time-varying electromagnetic power source is a microwave power source. In one or more embodiments, the time-varying electromagnetic source is an rf power source.

For the purposes of the present disclosure, the following definitions are used.

A live antenna is an antenna driven by a time-varying microwave power source.

A grounded antenna is an antenna electrically tied to ground potential and/or the potential of the structure enclosing a gas to be ionized. For example, in one or more embodiments, the grounded antenna may be electrically connected to the ion source enclosure, which can either be itself grounded or at an elevated constant potential. The grounded antenna does not receive any time varying electromagnetic signals. The grounded antenna is unpowered.

Rotational symmetry is the property of an object by which the object appears the same after being rotated by some angle. The degree of rotational symmetry is the number of distinct orientations in which the object appears the same.

A magnet refers to any material or means of generating either a static or a time-varying magnetic field. In one or more embodiments, a magnet may be a single piece of magnetic material. In one or more embodiments, a magnet may be a plurality of magnetic materials. In one or more embodiments, the magnet may be a permanent magnet. In one or more embodiments, the magnet may comprise an alnico alloy. In one or more embodiments, the magnet may be a rare-earth magnet. In one or more embodiments, the rare-earth magnet may comprise Neodymium Iron Boron (NdFeB). In one or more embodiments, the rare-earth magnet may comprise Samarium Cobalt (SmCo). In one or more embodiments, a magnet may be one or more electromagnets. In one or more embodiments, a magnet may be a combination of one or more magnetic materials and one or more electromagnets. In one or more embodiments, a magnet may further comprise materials and/or means to shape the magnetic field generated by the magnet.

Figure 2:
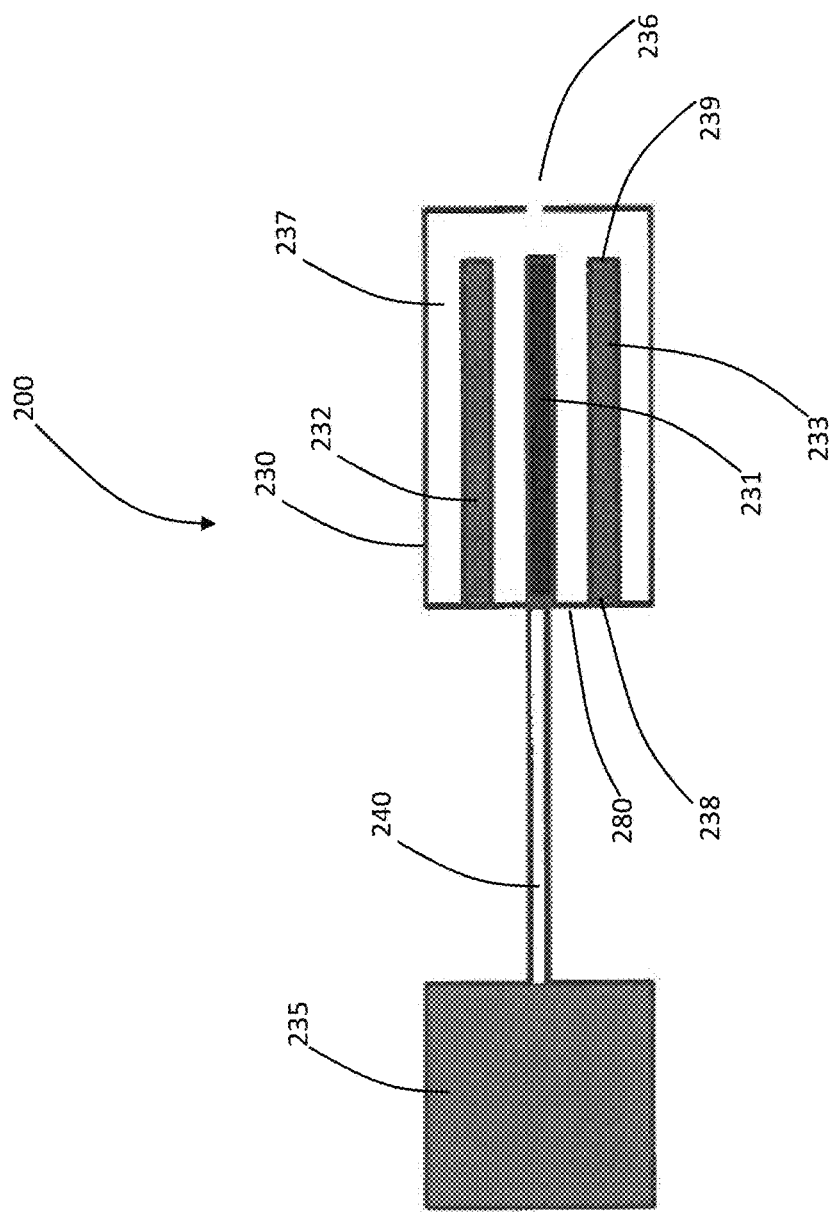
FIG. 2 is a schematic diagram of one or more embodiments of a multi-antenna ion source coupled to a time-varying electromagnetic power source.

Ionization may also be produced utilizing electromagnetic (EM) waves. Referring to FIG. 2, in one or more embodiments of a multi-antenna ion source (200), a time-varying electromagnetic power source (235) is electrically coupled to a plurality of live antennas (232, 233). In one or more embodiments, there is at most one grounded antenna (231). However, in other embodiments, the multi-antenna ion source may comprise a plurality of grounded antennas. In one or more embodiments, the number of live antennas is greater than the number of grounded antennas.

In one or more embodiments, a base plate (280), at least one wall (230), and a plurality of live antennas (232, 233) disposed within the volume defined by the base plate and the at least one wall form a single resonant microwave cavity, which makes up a multi-antenna ion source (200).

In one or more embodiments, the multi-antenna ion source (200) comprises a base plate (280) or base. The base (280) of the multi-antenna ion source (200) serves to set the surface on which the fixed points, or nulls, of the electromagnetic fields produced by the live antennas (232, 233) are located. (The live antennas (232, 233) radiate electromagnetic quarter-waves with a null in the electromagnetic field at the base plate and a peak in the electromagnetic field at the live antenna tips.)

In one or more embodiments, the multi-antenna ion source (200) may comprise at least one wall (230). In one or more embodiments, the at least one wall (230) may be a cylindrical wall. In one or more embodiments, the at least one wall (230) may be a wall of variable radius of curvature. In one or more embodiments, the at least one wall (230) may be a plurality of walls. For the purpose of this disclosure, a wall (230) of the multi-antenna ion source (200) may comprise a plurality of walls.

For the purposes of this disclosure, the volume defined by the base plate (280) and the at least one wall (230) includes all points found along any line segment between any two points lying on the combined surfaces of the base plate and the at least one wall.

In one or more embodiments, the base plate (280) is electrically coupled to the at least one wall (230). In one or more embodiments, the plurality of live antennas (232, 233) are not electrically coupled to the base plate (280). In one or more embodiments, the plurality of live antennas (232, 233) are not electrically coupled to the at least one wall (230).

In one or more embodiments, the time-varying electromagnetic power source (235) may be a microwave power source. In one or more embodiments, the time-varying electromagnetic power source (235) may be an rf power source. EM energy is brought into the ion source region by the plurality of live antennas (232, 233). In one or more embodiments, the microwave power source (235) may be a magnetron, a klystron, a traveling wave tube (TWT), or other form of vacuum tube, or a solid state power amplifier (SSPA), etc. In one or more embodiments, the operating frequency of the microwave power source (235) ranges from 500 MHz to 100 GHz, although other frequencies may be used. In one or more embodiments, the operating frequency is 2.45 GHz. In one or more embodiments, the input power to the microwave power source (235) ranges from 0.1 W to 100 W, although other input power levels may be used. Advantageously, a multi-antenna ion source (200) operates with greater power efficiency than a hot cathode ion source (100) from FIG. 1. Also advantageously, an SSPA can deliver low power stably, whereas other microwave sources can only produce higher power stably. Thus, in one or more embodiments, the microwave power source (235) may comprise an SSPA operating at low enough power to deliver microwave energy to the multi-antenna ion source (200) via a coaxial cable (240) rather than a waveguide or microwave window, which may be used at higher powers and are physically much larger than a coaxial cable. Advantageously, an SSPA is more compact and is capable of operating at higher ambient temperatures than other microwave power sources. In one or more embodiments, SSPAs may be based on Gallium Nitride (GaN), Silicon Carbide (SiC), or Gallium Arsenide (GaAs), though there are other possibilities as well. Advantageously, SSPAs at these frequencies and powers are readily available and inexpensive.

In one or more embodiments, the electrical connection between the microwave power source (235) and plurality of live antennas (232, 233) may comprise a cable (240). The cable (240) may be a coaxial cable, also referred to as a coax cable. In one or more embodiments, the plurality of live antennas (232, 233) and at most one grounded antenna (231) are enclosed in a microwave cavity which we refer to as the multi-antenna ion source (200). In one or more embodiments, the antennas (231, 232, 233) are quarter-wave antennas. In one or more embodiments, the antennas (231, 232, 233) are solid rods. In one or more embodiments, there is no grounded antenna and the plurality of live antennas (232, 233) do not all have the same phase. As an example, with two live antennas (232, 233) and no grounded antenna, the two live antennas may be 180° out of phase. In other words, when one live antenna (232) is at a positive peak field, the second live antenna (233) would be at a negative peak field so that the electric field between the two live antennas is maximum.

In one or more embodiments, a multi-antenna ion source (200) is within a hermetically-sealed tube (not shown in FIG. 2). The multi-antenna ion source (200) is the region of the hermetically-sealed tube where plasma is generated. The multi-antenna ion source (200) may be separate from or integral with the hermetically-sealed tube in this same region. Thus, in one or more embodiments, the multi-antenna ion source (200) may optionally share structure with the hermetically-sealed tube. For example, in FIG. 2, the base (280) and walls (230) of the multi-antenna ion source may be part of the hermetically-sealed tube. In one or more embodiments, the multi-antenna ion source (200) may be entirely contained within (and separate from) the hermetically-sealed tube.

The hermetically-sealed tube contains a gas (237). In one or more embodiments, the gas (237) may be deuterium-enriched hydrogen gas, for example, $D_2$. In one or more embodiments, the gas (237) is essentially 100% $D_2$. In one or more embodiments, the gas (237) comprises a mixture of $D_2$ and $T_2$. In one or more embodiments, the gas (237) comprises substantially equal amounts of $D_2$ and $T_2$. The antennas (231, 232, 233) each comprise an antenna base (238) that may be connected mechanically to the base plate (280). In one or more embodiments, the tip (239) of each of the antennas (231, 232, 233) is not mechanically connected directly to any structure. The plurality of live antennas (232, 233) may be electrically connected to the time-varying electromagnetic power source (235) through the multi-antenna ion source base (280) and hermetically sealed-tube via feedthroughs. A feedthrough allows microwave power to transmit through its center pin to the antenna while keeping the antenna electrically isolated from ground or the potential of the base plate (280) and walls (230). In one or more embodiments, there is a single grounded antenna (231) that is electrically connected to the base plate (280) of the multi-antenna ion source (200) and electrically insulated from the time-varying electromagnetic power source (235). In one or more embodiments, the multi-antenna ion source has an aperture (236) that allows ions to be extracted from or out of the multi-antenna ion source (200) to elsewhere within the hermetically-sealed tube (typically accelerated toward a target through a so-called acceleration column). In one or more embodiments, the multi-antenna ion source (200) may further comprise one or more magnets. In one or more embodiments, the one or more magnets are all disposed outside the hermetically-sealed tube. Such magnet embodiments will be discussed in greater detail with reference to FIG. 6. Embodiments without a magnet may be referred to as rf ion sources, whereas embodiments with a magnet may be referred to as microwave ion sources or electron-cyclotron-resonance (ECR) sources. Embodiments of the present disclosure extend to both rf ion sources as well as microwave ion sources. The end-use application of the multi-antenna ion source may dictate which type of ion source is more applicable.

In one or more embodiments, a multi-antenna ion source is operated in a pulsed mode. In one or more embodiments, a multi-antenna ion source is operated in a continuous mode.

In one or more embodiments, an rf ion source operates with an input power in a range of 5-20 W. In one or more embodiments, an rf ion source operates in a neutral gas pressure range of 10-1000 mTorr. In one or more embodiments, an rf ion source is used in a high pressure mass spectrometer. In one or more embodiments, an rf ion source is used in a light source.

Figure 3:
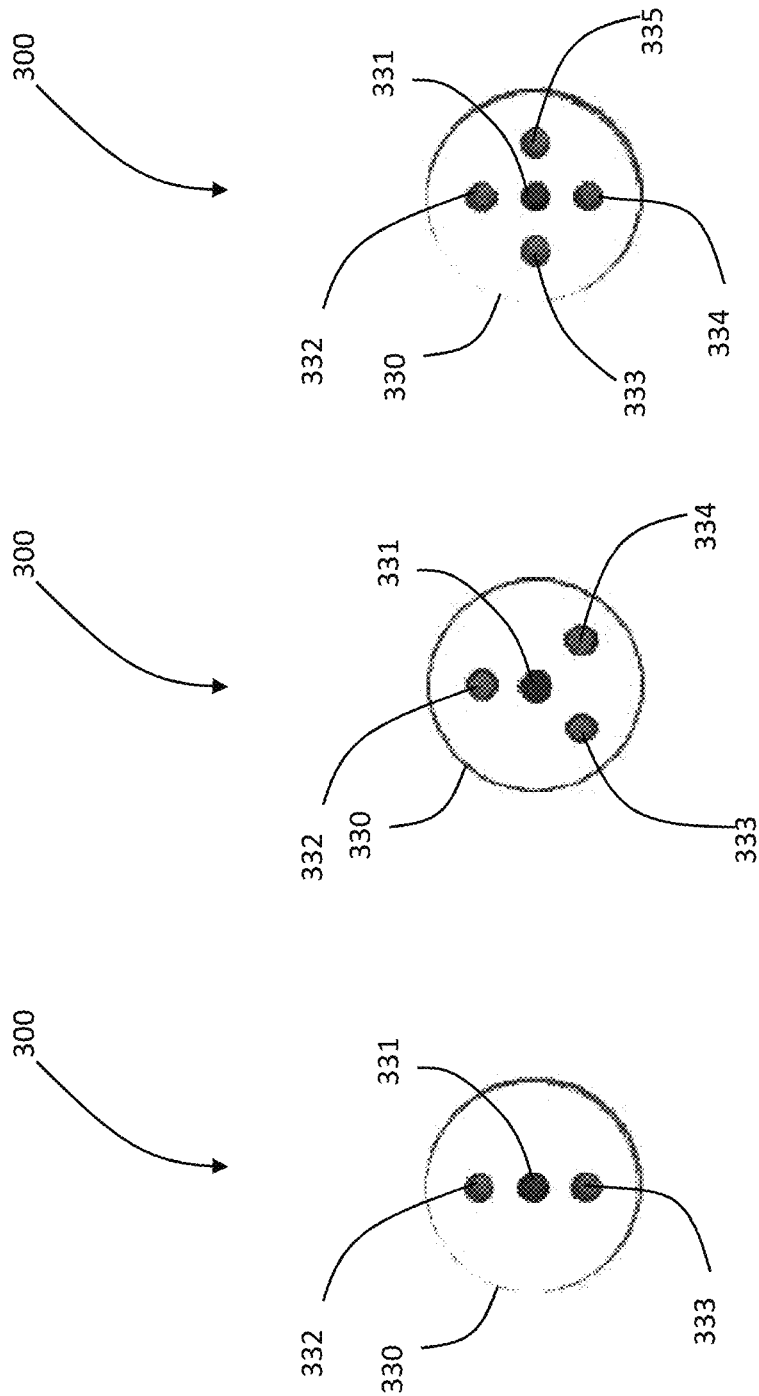
FIGS. 3A-3C each show a schematic end view of one or more embodiments of a multi-antenna ion source.

FIGS. 3A-3C provide end views of one or more embodiments a multi-antenna ion source (300) showing walls (330). The number of live antennas (332, 333, 334, 335) is variable and depends on the available space within the walls (330), the desired EM mode configuration, and the desired plasma spatial extent. FIGS. 3A-3C each show embodiments of a multi-antenna ion source with live antennas (332, 333, 334, 335) located to create rotational symmetry about an axis of the multi-antenna ion source (300). In one or more embodiments, a grounded antenna (331) is located on the axis of rotational symmetry of the multi-antenna ion source (300). In one or more embodiments, shown in FIG. 3A, two live antennas (332, 333) are located with rotational symmetry around a grounded antenna (331). In one or more embodiments, shown in FIG. 3B, three live antennas (332, 333, 334) are located with rotational symmetry around a grounded antenna (331). In one or more embodiments, shown in FIG. 3C, four live antennas (332, 333, 334, 335) are located with rotational symmetry around a grounded antenna (331). In one or more embodiments, a multi-antenna ion source does not possess rotational symmetry. Advantageously, the plurality of live antennas (332, 333, 334, 335) of the present disclosure allows a smaller transverse dimension of the multi-antenna ion source (300) as compared to a design with a plurality of grounded antennas. This reduction is enabled by concentrating the electric field from the plurality of live antennas (332, 333, 334, 335) between the tips of the antennas. In contrast, in a design with a plurality of grounded antennas, the electric fields are concentrated between the tips of the plurality of grounded antennas and the wall of the ion source. Advantageously, the plurality of live antennas of one or more embodiments of the present disclosure produces a higher peak electric field than for a design with a plurality of grounded antennas for the same input power, resulting from the reduction in transverse dimension of the ion source.

Figure 4:
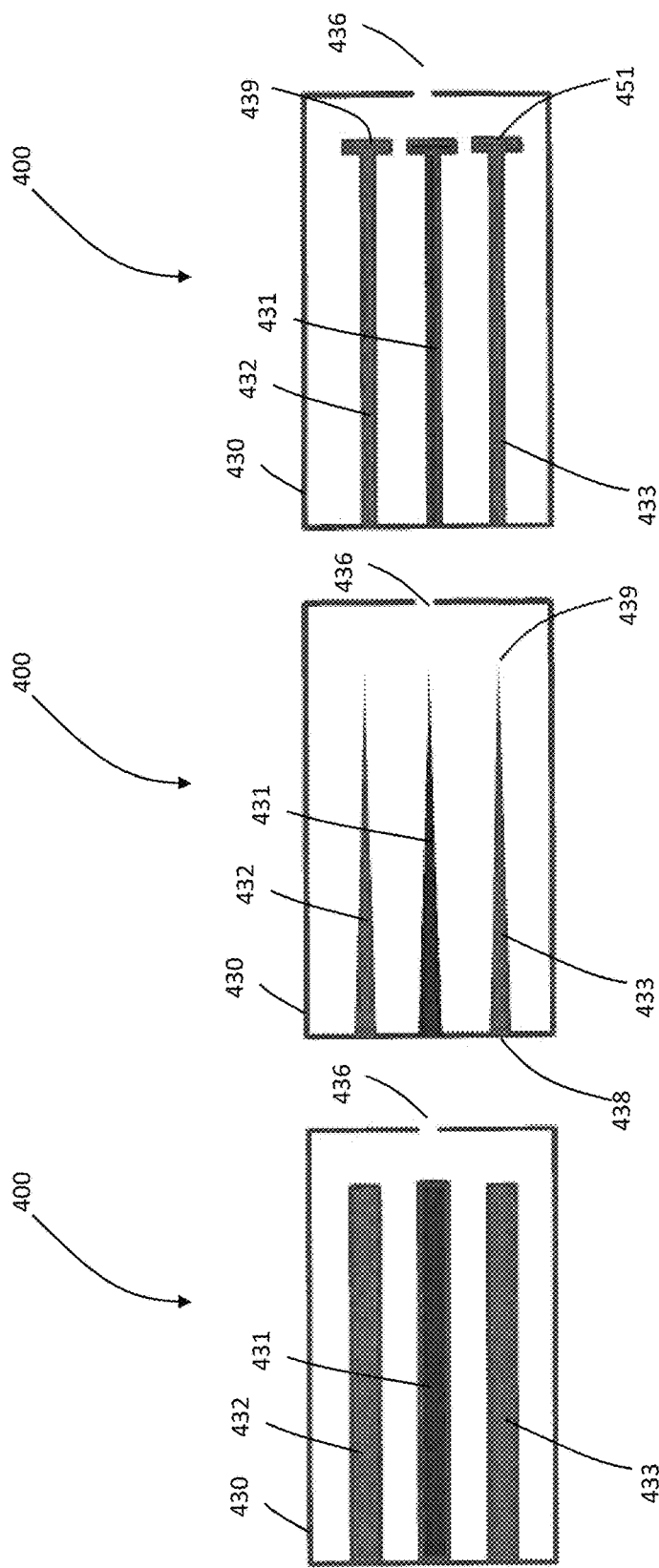
FIGS. 4A-4C each show a schematic side view of one or more embodiments of a multi-antenna ion source.

The shape of the antennas (431, 432, 433) can be optimized to enhance the electric field, which initially ionizes the neutral atoms or molecules. This type of electric field enhancement may allow the initial ignition of the plasma to occur at lower gas pressures, which advantageously improves the reliability and increases the lifetime of the multi-antenna ion source (400) by eliminating certain damaging processes that result from energetic particle interactions with a gas. In one or more embodiments, for example, as shown in FIG. 4A, live antennas (432, 433) and the grounded antenna (431) are cylindrically-shaped rods. In one or more embodiments, the shape of the antennas (431, 432, 433) or cross-sectional area varies along the length of the antenna. In one or more embodiments, for example, as shown in FIG. 4B, live antennas (432, 433) and grounded antenna (431) are conically-shaped rods with the base of the cone corresponding to the base (438) of the antennas (431, 432, 433) and the tip of the conically-shaped antennas corresponding to the tip (439) of the antennas (431, 432, 433). This sharpened profile creates a larger electric field at the tip than the cylindrical antennas. In one or more embodiments, for example, as shown in FIG. 4C, live antennas (432, 433) and grounded antenna (431) have T-shaped tips (451). T-shaped tips (451) may increase the radial electric field between the tips of the antennas and the inner wall (430) of the multi-antenna ion source (400). Further, in one or more embodiments, the antennas do not have azimuthally symmetric profiles. The antennas (431, 432, 433) may have cross-sections of arbitrary shape to optimize the electric field configuration of the multi-antenna ion source (400). Examples of cross-sections include triangular, square, etc. An aperture (436) allows ions created by the multi-antenna ion source (400) to be extracted to another section of the hermetically-sealed tube (typically accelerated towards a target through a so-called acceleration column).

Figure 5:
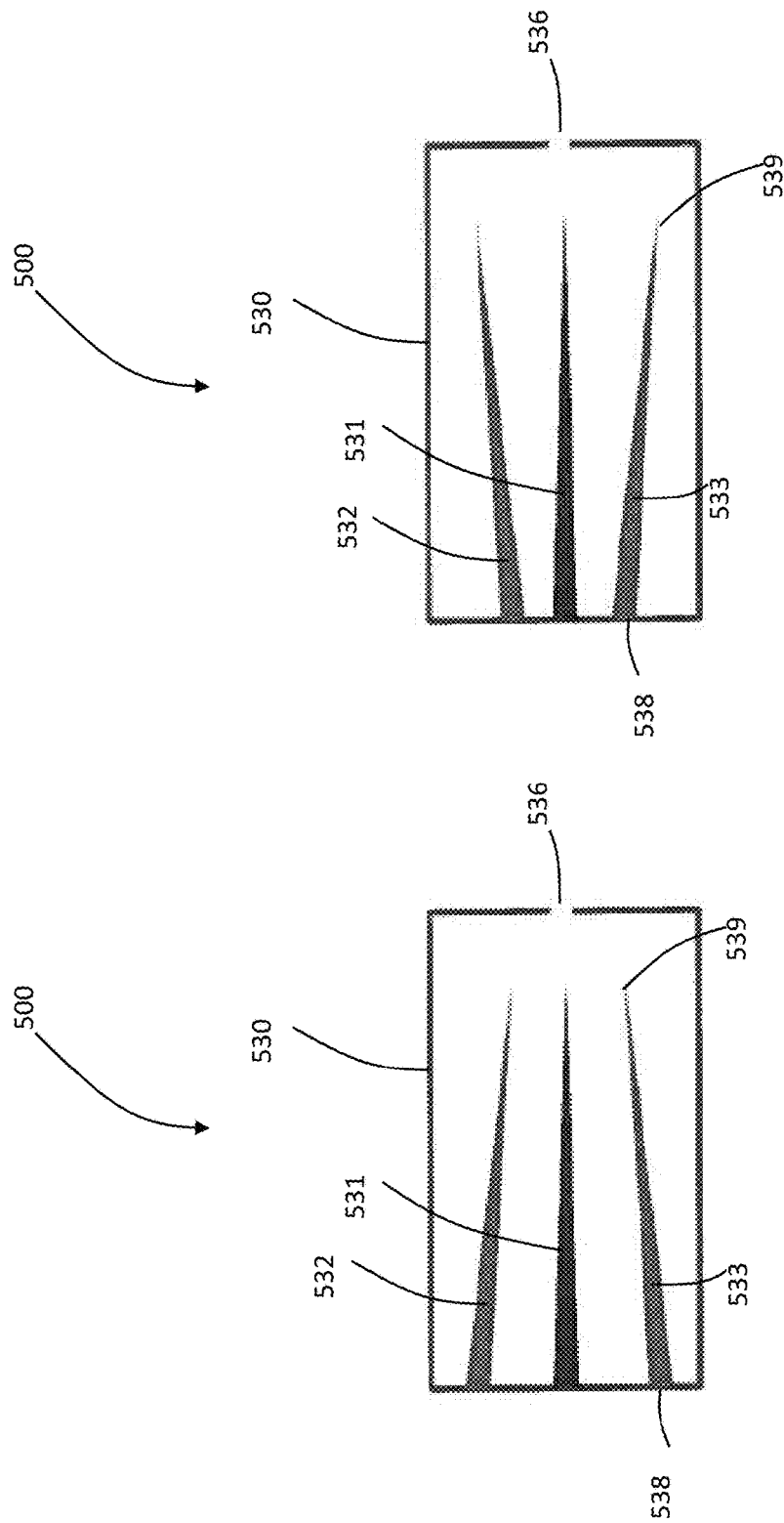
FIGS. 5A and 5B each show a schematic side view of one or more embodiments of a multi-antenna ion source.

Referring to FIGS. 5A and 5B, in one or more embodiments, the longitudinal axes of the antennas (531, 532, 533) are not oriented parallel to each other as they are, for example, in FIG. 4B. Such embodiments may provide increased electric field strength in certain areas. Regarding FIG. 5A, in one or more embodiments, the antennas (531, 532, 533) may be oriented so that the tips (539) of the antennas are closer to each other than the bases (538) of the antennas are. Such "tip-in" embodiments may increase the electric field between the antennas (531, 532, 533). Regarding FIG. 5B, in one or more embodiments, the antennas (531, 532, 533) may be oriented so that the tips (539) of the antennas are farther from each other than the bases (538) of the antennas are. Such "tip-out" embodiments would increase the electric field between the antennas (531, 532, 533) and the inner wall (530) of the multi-antenna ion source (500).

Figure 6:
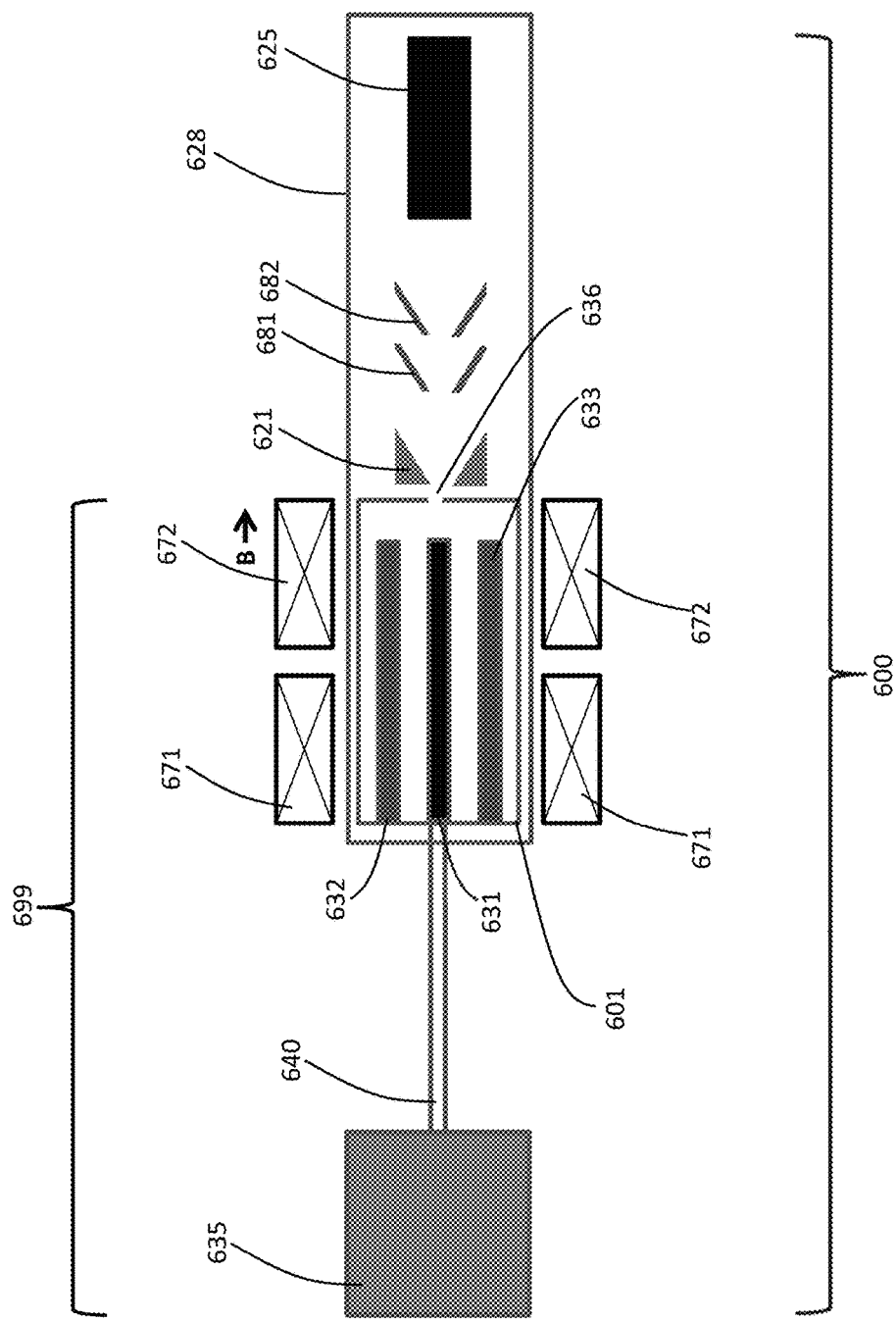
FIG. 6 is a schematic diagram of one or more embodiments of a neutron generator comprising a multi-antenna ion source.
Figure 7:
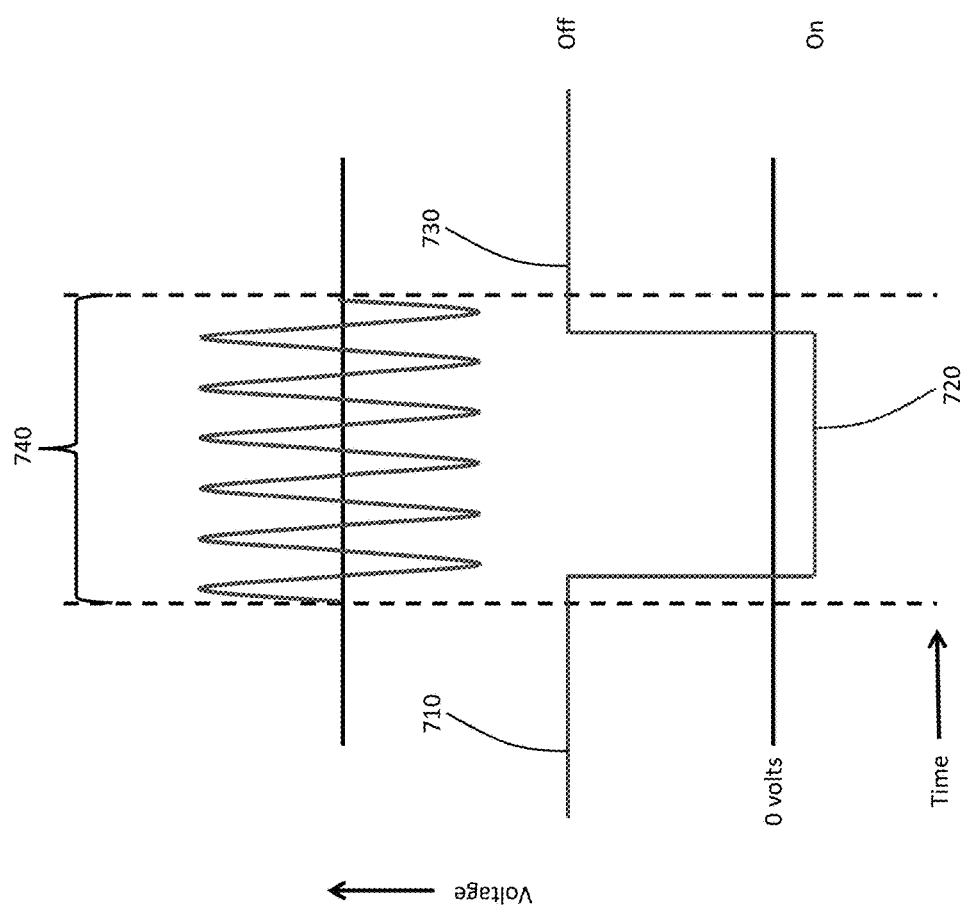
FIG. 7 is a schematic diagram of one or more embodiments of a pulsed neutron generation method.

Referring to FIG. 6, in one or more embodiments, a neutron generator (600) may comprise a microwave ion source (699). In one or more embodiments of a microwave ion source (699), at least one magnet (671, 672) produces a magnetic field (B) oriented substantially parallel to a longitudinal axis of the multi-antenna ion source (601), though the magnetic field (B) can also be oriented in other directions as well. In one or more embodiments, the at least one magnet (671, 672) is disposed around a hermetically-sealed tube (628), where the interior of the tube may optionally be substantially free of magnets. In one or more embodiments, the hermetically-sealed tube (628) may contain a gas comprising deuterium and/or tritium. Features presented above with regard to multi-antenna ion sources (601) without a magnet may be incorporated in the microwave ion source (699) and will not be repeated here. In one or more embodiments, the multi-antenna ion source (601) also contains one grounded antenna (631).

A magnetic field (B) is introduced into the multi-antenna ion source (601) or ionizer region. In one or more embodiments, the at least one magnet (671, 672) is a permanent magnet. In one or more embodiments, the at least one magnet (671, 672) is a rare-earth magnet. In one or more embodiments, the at least one magnet (671, 672) is a Neodymium Iron Boron (NdFeB) magnet. In one or more embodiments, the at least one magnet (671, 672) is a Samarium Cobalt (SmCo) magnet. In one or more embodiments, the at least one magnet (671, 672) is an electromagnet. In one or more embodiments, the at least one magnet (671, 672) is an assembly of permanent magnets. In one or more embodiments, the at least one magnet (671, 672) further comprises materials and/or means to shape the magnetic field (B).

The ionization mechanism for a microwave ion source (699) is called Electron Cyclotron Resonance (ECR). A magnetic field (B) is introduced into the multi-antenna ion source region. The magnetic field (B) introduces so-called cyclotron motion in any liberated electrons with the multi-antenna ion source (601). Cyclotron motion is circular motion around the magnetic field lines with a frequency given by the cyclotron frequency, $$\omega_c = qB/m$$

Where q is the electron charge, B is the magnitude of the magnetic field, and m is the electron mass. If one applies external EM waves at this frequency, a resonant process occurs that efficiently couples microwave power from the EM wave to the electron transverse momentum. These so-called hot electrons gain energy efficiently from the EM wave and more effectively ionize gas molecules via impact ionization interactions.

In one or more embodiments of the microwave ion source (699), the resonance region is tailored so that it coincides with the peak electric field created by the antennas (631, 632, 633). The resonance region is where the value of the magnetic field substantially equals the value required for the ECR resonance condition to be true. In one or more embodiments, the peak electric field is in the region between the tips of the antennas. In one or more embodiments, the peak electric field is between the tips of the antennas and the walls of the multi-antenna ion source (601). Free, or liberated, electrons that repeatedly pass through the resonance region will get excited to higher and higher energies each time, causing further collisional ionizations. The resulting ionization efficiency can be very high depending on the microwave power used, approaching 100% for very high powers, meaning that a substantial fraction of the neutral gas has been ionized creating a plasma. For more moderate powers, the ionization efficiency may be in the 10-50% range. In this way, the Electron Cyclotron Resonance Heating (ECRH) process is an efficient way to couple EM energy into the multi-antenna ion source cavity.

Advantageously, a plasma produced by a microwave ion source (699) can have a very high monatomic fraction, which is important for attaining high neutron yield in a neutron generator (600).

In one or more embodiments of the neutron generator (600), once the plasma has been created, the ions must be extracted to form a beam. In one or more embodiments, an electric field substantially parallel to the axis of the multi-antenna ion source (601) is applied to have the ions preferentially travel out of the microwave ion source (699) via aperture (636) toward the acceleration column. In one or more embodiments, this is achieved through a continuous potential applied to an extractor (621), also referred to as an extractor electrode. In one or more embodiments, this is achieved through a pulsed potential applied to an extractor (621). In one or more embodiments, the extractor (621) may be similar to the extractor (120) present in the hot cathode neutron generator (100). In one or more embodiments, a neutron generator (600) comprises a multi-antenna ion source (601), electrodes (680, 681) for shaping and accelerating an ion beam, and a target (625). In one or more embodiments, electrodes (680, 681) operate in an accel-accel mode. In one or more embodiments, electrodes (680, 681) operate in an accel-decel mode.

The terms accel-accel mode and accel-decel mode refer to the electrostatic potential applied to the electrodes (681, 682) in the acceleration column of typical ion sources. Once the ion beam has left the extraction aperture (636) of the ion source (601), typically two or more further electrodes (e.g., 681, 682) are used to accelerate the beam towards a target (625) or into another accelerator. These electrodes also serve the purpose of focusing or defocusing the beam, in a direct analogy to optics. An accel electrode has a voltage that will accelerate the ion beam to higher energies. These electrodes (681, 682) can be used not only to accelerate/decelerate an ion beam or focus/defocus an ion beam but can also be used to suppress the generation of electrons when the ion beam encounters the target (625). In such embodiment(s), the electrode just before the target (625) is placed at an electrostatic potential slightly more negative than the target, such that generated secondary electrons are pushed back into the target. Typical configuration for ion sources can be 'accel-accel', which feature two accelerating electrodes before the target, 'accel-decel', 'accel-accel-decel' or the like. The larger the number of electrodes, the finer control one has on the beam optics.

In one or more embodiments, ions are accelerated to the target (625). In one or more embodiments, the target (625) comprises deuterium. In one or more embodiments, the target comprises tritium. In one or more embodiments, the target (625) comprises deuterium and/or tritium. In one or more embodiments, the target (625) comprises deuterium and/or tritium and the hermetically-sealed tube (628) contains a gas comprising deuterium and/or tritium. In one or more embodiments, the target (625) comprises titanium into which $D_2$ and/or $T_2$ molecules are impregnated.

In contrast to a hot cathode neutron generator (100), because the ionization of the microwave ion source (699) can be very high, the remaining neutral density can be proportionally lower, so that consideration of collisions with these neutrals is less of a concern. In addition, in one or more embodiments, the microwave ion source (699) operates at low pressures, which further reduces interaction with neutral gas atoms. Charge exchange collisions of ions with neutrals are deleterious and damaging to an ion source and seriously degrade the lifetime of the ion source. Advantageously, the microwave ion source (699) can reduce charge exchange collisions of ions with neutrals. In one or more embodiments, the microwave ion source (699) operates in a range of 0.1-15 mTorr. For at least these reasons, one or more embodiments have the advantage of higher reliability than hot cathode neutron generators.

In one or more embodiments, very high ion beam currents may be generated. In one or more embodiments, an input power range to the neutron generator (600) comprising a microwave ion source (699) ranging from 0.1 W to 100 W may produce an ion beam current density ranging from 0.1-100 mA/cm$^2$. In such a higher power embodiment, a value of 50 mA/cm$^2$ beam current density is achievable, which can correspond to a large ion beam current of above 100 mA. An ion beam current of 100 mA could generate $10^{11}$ neutrons/second. In a lower power embodiment, the input power would be 1 W. In one or more embodiments, the ion beam current ranges between 0.5 and 5 mA. By comparison, the hot cathode neutron generator (100) would produce much less current for the same input power, since the ECR is such an efficient process.

Comparing the hot cathode neutron generator (100) of FIG. 1 to a multi-antenna ion source neutron generator (600) of FIG. 6, the multi-antenna ion source neutron generator (600) advantageously results in higher ionization efficiency, i.e., it produces a much higher ratio of ion-to-neutral-particle density than the hot cathode neutron generator (100). In addition, the multi-antenna ion source neutron generator (600) generates a higher monatomic fraction. The higher ionization efficiency combined with the much higher monatomic fraction allows the multi-antenna ion source neutron generator (600) to have a higher neutron yield than the hot cathode neutron generator (100).

In one or more embodiments, a neutron generator (600) may be operated in a pulsed mode, where neutrons are produced in pulses, or bursts. In one or more embodiments, it may be advantageous for the pulses of neutrons to have very fast rise times and falls times. In other words, it may be advantageous to produce as close to a temporal square wave pulse of neutrons as possible, which may be called a sharp pulse. A sharp pulse of ions will produce a sharp pulse of neutrons. One advantage of sharp neutron pulses is the ability to distinguish between inelastic and capture neutrons in the detected neutron burst. Inelastic neutrons are those neutrons that interact inelastically with nuclei, producing a first type of characteristic gamma rays, while capture neutrons are those neutrons that are captured by nuclei, producing a second type of characteristic gamma rays. In one or more embodiments, sharp pulses may be used to distinguish saline earth formation waters from hydrocarbons in a subterranean environment such as a well. In such embodiments, the sharp pulse (or square pulse) may allow removal of capture gamma ray contamination and its associated salinity dependence from the inelastic gamma ray spectrum used to compute carbon-oxygen (C/O) ratio.

A pulse of ions may be created by at least two methods. A first method is to pulse the microwave power source itself. In this case, the plasma formation is pulsed and ions are extracted by an extractor for as long as the plasma is generated. In this case, the electrostatic potentials (or voltages) on the electrodes (680, 681) are fixed.

A second method of creating a pulse of ions is a pulsed extraction method. In the pulsed extraction method, a pulsed voltage is applied to an extractor (621), which inhibits extraction of the ion beam when off, but allows ions to be extracted when on. Here, off would be a retarding positive voltage (710, 730) and on would be a negative extractor voltage (720). The negative extractor voltage (720) allows ion extractions from the ion source and accelerates the ions toward a target, while the retarding positive voltage (710, 730) inhibits ion extractions from the ion source. This second method may be effective and result in rapid rise times and fall times for the neutron pulses. To accomplish this method, the microwave power is either continuous or it is pulsed but with a wider pulse width (740) than the extractor voltage pulse (720). That is, the extractor voltage pulse (720) resides temporally within the microwave power pulse (740). So even though there is plasma generation before and after the extractor voltage pulse is turned on, this plasma will remain within the multi-antenna ion source and not result in an ion beam.

Advantageously, a multi-antenna ion source may have better reliability than previous ion sources. Thus, incorporating a multi-antenna ion source into a neutron generator produces an ultra-reliable neutron generator.

In one or more embodiments, a multi-antenna ion source neutron generator may be used in oilfield applications. In one or more embodiments, a multi-antenna ion source neutron generator may be part of a wireline logging tool. In one or more embodiments, a multi-antenna ion source neutron generator may be part of a logging while drilling (LWD) tool. One of ordinary skill in the art will recognize that other conveyance modes may be used, for example, coiled tubing, slick line, tractor, etc. In one or more embodiments, a multi-antenna ion source neutron generator may be used in a tool that measures neutron porosity. In one or more embodiments, a multi-antenna ion source neutron generator may be used in a tool that measures hydrogen index. In one or more embodiments, a multi-antenna ion source neutron generator may be used in a tool that measures capture cross-section, or sigma. In one or more embodiments, a multi-antenna ion source neutron generator may be used in a tool that measures induced gamma rays. For example, the tool may measure capture gamma rays. In another example, the tool may measure inelastic gamma rays. In one or more embodiments, a multi-antenna ion source neutron generator may be used in a neutron-induced gamma ray density logging tool.

Figure 8:
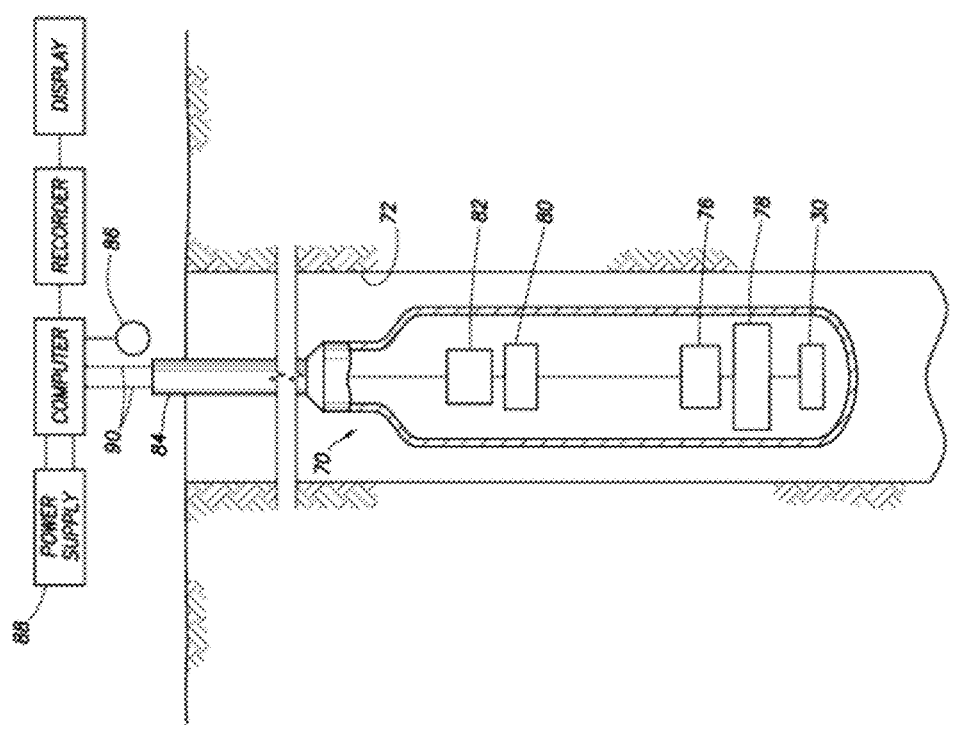
FIG. 8 is a schematic of a neutron generator used in a downhole application according to one or more embodiments.

FIG. 8 shows a schematic of one or more embodiments of a nuclear logging tool (70) comprising a multi-antenna ion source neutron generator in a wellbore (72), or borehole. In one or more embodiments, a downhole nuclear logging tool (70) comprises a multi-antenna ion source neutron generator (30). In one or more embodiments, the nuclear logging tool (70) may comprise a nuclear detector (76). One skilled in the art will recognize that in one or more embodiments, the nuclear logging tool (70) may comprise a plurality of nuclear detectors (76). In one or more embodiments, the nuclear detector (76) is a neutron detector. In one or more embodiments, the neutron detector may be a helium-3 detector. In one or more embodiments, the neutron detector may be a solid-state detector. In one or more embodiments, the nuclear detector (76) may be a gamma-ray detector. In one or more embodiments, the nuclear detector (76) may be a scintillation detector. In one or more embodiments, the plurality of nuclear detectors (76) may comprise different types of nuclear detectors. In one or more embodiments, the nuclear logging tool (70) may comprise appropriate shielding material (78) between a neutron generator (30) and a nuclear detector (76) to reduce the undesired direct flux of radiation. In one or more embodiments, the nuclear logging tool (70) comprises electronics/circuitry (80) for analysis of output signals that may be transmitted to a computer (82). In one or more embodiments, the nuclear logging tool (70) is supported in the wellbore (72) by a carrier (84), or mode of conveyance such as LWD, wireline, slickline, coiled tubing, tractor, etc.

One or more embodiments of the present disclosure provide a method for generating ions. In one or more embodiments, a neutral gas is provided in a hermetically-sealed tube. In one or more embodiments, electromagnetic energy from a microwave power source is supplied to a multi-antenna ion source region via a plurality of live antennas. Upon supplying the electromagnetic energy, the electrically neutral gas is ionized to produce ions. Ions may thereafter collide and impinge on a target to generate neutrons, in the case of a neutron generator. When the neutron generator is used downhole, the borehole and the earth formation may be irradiated with the bursts of neutrons generated, and radiation resulting from the interaction of the neutrons with the formation may be detected. Signals representative of the detected radiation may be generated and transmitted to the surface, thereby allowing for the determination of a characteristic of the earth formation from the signals. It is understood that the type of radiation (and detector) may vary, as discussed above. Further, it is also envisioned for methods using the ion source in another capacity (other than as a neutron generator), the ions generated may have other intended uses.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:
1. An ion generating device comprising:
   a single power source that operates to supply time-varying electromagnetic power; and a multi-antenna ion source comprising:
  a plurality of live antennas electrically coupled to the single power source and configured to receive the time-varying electromagnetic power supplied by the single power source; and
  a single grounded antenna;
  wherein the plurality of live antennas operates to apply an electrical field that ionizes a gas to produce a plasma of ions.

2. The ion generating device according to claim 1, further comprising at least one magnet, wherein the at least one magnet generates a magnetic field substantially parallel to a longitudinal axis of the multi-antenna ion source, and wherein the time-varying electromagnetic power source operates at a frequency corresponding to a cyclotron frequency defined by a value of the magnetic field within the multi-antenna ion source.

3. The ion generating device according to claim 1, wherein the grounded antenna is disposed along a longitudinal axis of the multi-antenna ion source, and wherein the grounded antenna is at the same electrical potential as the base plate.

4. The ion generating device according to claim 1, wherein the plurality of live antennas are disposed with rotational symmetry about the longitudinal axis of the multi-antenna ion source.

5. The ion generating device according to claim 2, wherein the at least one magnet is an electromagnet.

6. The ion generating device according to claim 2, wherein the at least one magnet is a permanent magnet.

7. The ion generating device according to claim 6, wherein the at least one magnet is a rare-earth magnet.

8. The ion generating device according to claim 7, wherein the rare-earth magnet is a Neodymium Iron Boron magnet.

9. The ion generating device according to claim 7, wherein the rare-earth magnet is a Samarium Cobalt magnet.

10. The ion generating device according to claim 1, wherein the single power source comprises a solid state power amplifier.

11. An ion generating device comprising:
a single power source that operates to supply time-varying electromagnetic power; and
a multi-antenna ion source comprising:
  a plurality of live antennas electrically coupled to the single power source and configured to receive the time-varying electromagnetic power supplied by the single power source, wherein the plurality of live antennas operate to apply an electrical field that ionizes a gas to produce a plasma of ions, the multi-antenna ion source has no grounded antenna, and the plurality of live antennas do not all have the same phase.

12. A neutron generator, comprising:
a single power source that operates to supply time-varying electromagnetic power;
a hermetically-sealed tube;
a multi-antenna ion source disposed within the hermetically-sealed tube, the multi-antenna ion source comprising:
  a plurality of live antennas electrically coupled to the single power source and configured to receive the time-varying electromagnetic power supplied by the single power source; and
  at most one grounded antenna;
  wherein the plurality of live antennas operates to apply an electrical field that ionizes a gas contained within the hermetically-sealed tube to produce a plasma of ions;
an extractor disposed adjacent to an aperture of the multi-antenna ion source;
at least one magnet generating a magnetic field substantially parallel to a longitudinal axis of the multi-antenna ion source;
a target disposed within the hermetically-sealed tube; and
a plurality of electrodes configured to accelerate, decelerate, or both accelerate and decelerate ions toward the target;
wherein the single power source operates at a frequency corresponding to a cyclotron frequency defined by a value of the magnetic field within the multi-antenna ion source.

13. The neutron generator according to claim 12, wherein the single power source comprises a solid state power amplifier.

14. The neutron generator according to claim 12, wherein the gas comprises deuterium.

15. The neutron generator according to claim 12, wherein the gas comprises tritium.

16. The neutron generator according to claim 12, wherein the target comprises deuterium.

17. The neutron generator according to claim 12, wherein the target comprises tritium.

18. The neutron generator according to claim 12, wherein the target comprises deuterium and tritium, and wherein the gas comprises deuterium and tritium.

19. A method for generating ions comprising:
providing an electrically neutral gas;
operating a single power source to supply time-varying electromagnetic power; and
providing a multi-antenna ion source with a plurality of live antennas that receive the time-varying electromagnetic power supplied by the single power source, wherein the plurality of live antennas operates to apply an electrical field that ionizes the electrically neutral gas to produce a plasma of ions.

20. The method for generating ions according to claim 19, further comprising:
extracting the ions from the multi-antenna ion source by pulsing an extractor voltage on and off;
wherein pulsing the extractor voltage on comprises applying a negative extractor voltage and pulsing the extractor voltage off comprises applying a positive extractor voltage;
wherein ionizing the electrically neutral gas comprises pulsing the single power source on and off; and
wherein the extractor voltage on and off occurs within an on pulse of the single power source.

21. The method for generating ions according to claim 19, further comprising:
extracting the ions from the multi-antenna ion source by applying a negative extractor voltage.

* * * * *